Feb. 3, 1948. L. R. BUCKENDALE 2,435,199
RESILIENT TORSION ROD SUSPENSION FOR TANDEM AXLE VEHICLES
Filed April 13, 1944 4 Sheets-Sheet 1

INVENTOR
LAWRENCE R. BUCKENDALE
BY
*Strauch & Hoffman*
ATTORNEYS

Patented Feb. 3, 1948

2,435,199

UNITED STATES PATENT OFFICE 2,435,199

RESILIENT TORSION ROD SUSPENSION FOR TANDEM AXLE VEHICLES

Lawrence R. Buckendale, Detroit, Mich., assignor to The Timken-Detroit Axle Company, Detroit, Mich., a corporation of Ohio Application April 13, 1944, Serial No. 530,936

19 Claims. (Cl. 280—104.5)

This invention relates to improvement in resilient suspension means for vehicles and has particular reference to an improved suspension means for the rear portion of a multi-wheel or tandem axle type of vehicle.

I am aware that torsional spring suspensions for multi-wheel or tandem axle vehicles are not broadly new. It has been found, however, among other things, that in such prior constructions the load distribution between the wheels at corresponding ends of the tandem axles is not accurately proportioned as the axle ends move relative to the vehicle frame due to road irregularities, which leads to unequal braking effects on the various wheels, uneven tire wear and a tendency for the wheels to "tramp" or vibrate under braking or tractive torsional loads; also the resilient force acting on the two wheels at corresponding axle ends tends to become uequal as the axle ends move up and down because of changes in the angularity of the links and levers connecting the axle to the spring suspension means; and the wheels tend to chatter or vibrate because of inadequate support for the driving and braking loads. There also occurs a certain amount of tire scuffing and heavy strain on the vehicle frame because of inadequate self-steering effects of the tandem axles.

It is therefore among the objects of the present invention to provide a resilient torsion suspension for a multi-wheel or tandem axle vehicle so arranged that substantially equal loads are maintained on the road wheels at the corresponding ends of the tandem axles at all times regardless of the movements of the axles relative to the frame occasioned by normal road irregularities.

A further object resides in the provision of a torsional resilient suspension means of the character indicated including mechanism for adjusting the resilient members which support the frame on the vehicle axles so that the frame may be maintained in a predetermined position relative to the axles and the loads on the axle ends thereby maintained substantially equal in amount.

A still further object resides in the provision of means for properly supporting the axle ends against driving and braking loads, both torsionally of the axles and fore-and-aft of the vehicle so that the axles cannot move out of position relative to the vehicle frame and tramping or vibration of the vehicle wheels is avoided.

A still further object resides in the provision, in a resilient torsional spring suspension of the character indicated, of means supporting the axles in proper position relative to the frame capable of providing a predetermined self steering effect for the tandem axles so that the axles will assume positions in substantial alignment with corresponding radii of the turning circle of the vehicle (and will thus avoid lateral frictional resistance of the vehicle tires on the road surface).

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken in a limiting or restrictive sense, since it will be apparent to those skilled in the art that various changes in the illustrated embodiment may be resorted to without in any way exceeding the scope of the invention.

In the drawings:

Figure 8 is a diagrammatic view of the mechanism under one set of operating conditions.

Referring to the drawings in detail, the numeral 10 indicates a vehicle frame side member. The vehicle frame or load supporting platform may be of the conventional form, having two channel or box section side members secured together by cross members, to which the vehicle axles and the vehicle engine or engines are secured to provide a substantially rigid chassis or, alternatively, the frame may be a structural part of the vehicle body to which the axles are secured by the improved torsional spring suspension. For the sake of simplicity, however, the improved spring suspension will be described as applied to a conventional frame having relatively heavy side members secured together by cross members riveted or welded thereto.

While only one side of the frame and the associated suspension mechanism has been illustrated, it is to be understood that there is a similar suspension mechanism at the opposite side of the frame functioning in the same manner.

Figures 1, 2:
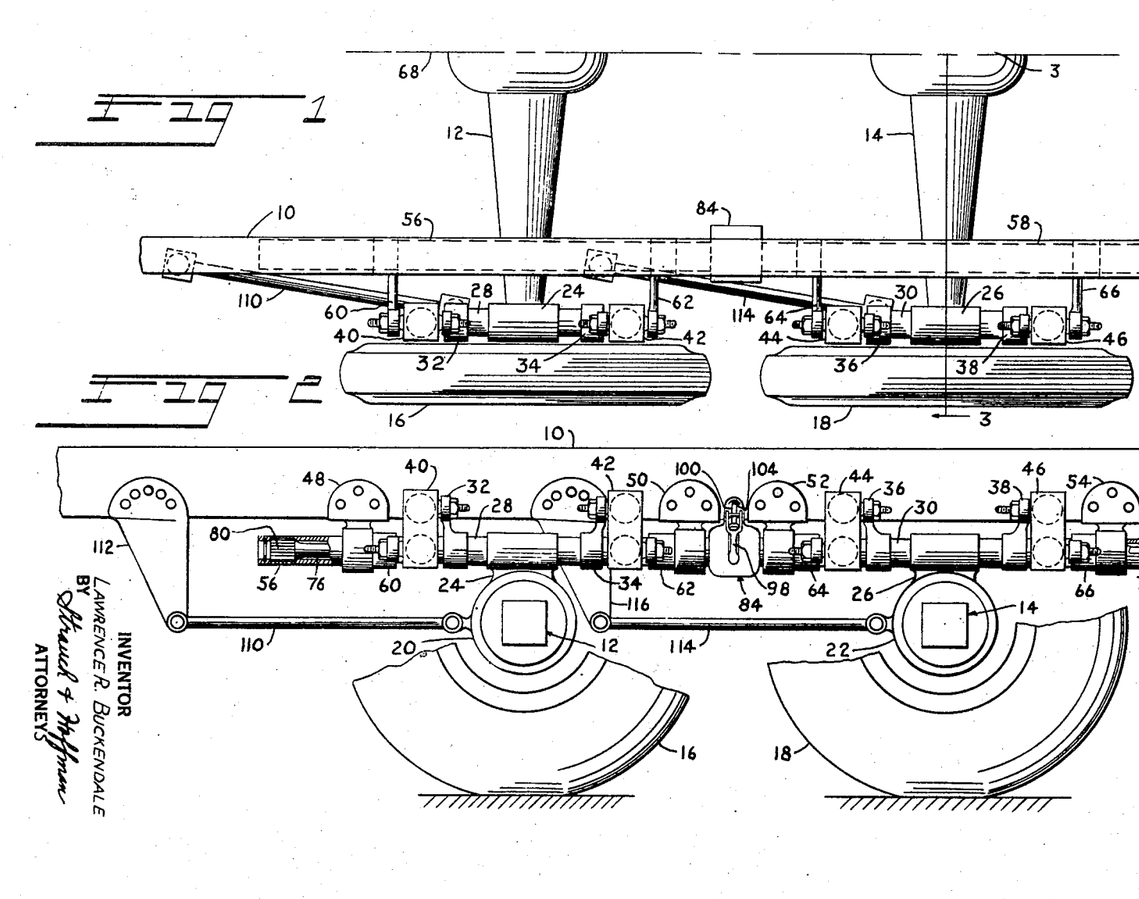
Figure 1 is a plan view of a fragmentary portion of a vehicle showing the application thereto of a torsional resilient suspension constructed according to the invention.
Figure 2 is an elevational view of the fragmentary portion of the vehicle shown in Figure 1, certain portions being broken away to better illustrate the construction thereof.

The rear portion of one side of the frame is illustrated in Figures 1 and 2 and beneath this frame are disposed two substantially parallel tandem axles, as generally indicated at 12 and 14, extending transversely of the frame. At each end thereof each axle carries a suitable load wheel, the wheel for the illustrated end of the axle 12 being indicated at 16 and the similar wheel for the corresponding end of the axle 14 being indicated at 18. These may be either single or dual wheels and may be of any desired construction.

Figure 3:
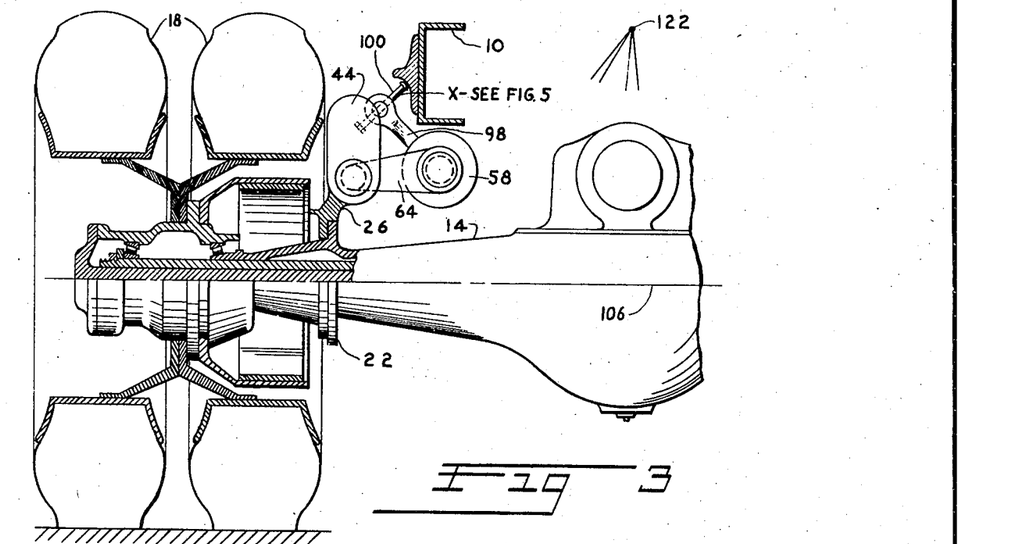
Figure 3 is a sectional view on the line 3—3 of Figure 1.

At each end of each axle adjacent the corresponding wheel there is provided an external flange or projection, indicated at 20 and 22 in Figures 2 and 3, to which are attached upstanding respective bracket members 24 and 26. At its upper end each bracket member is provided with a cylindrical sleeve portion through which are inserted respective cylindrical, preferably tubular, bracket bars 28 and 30, the bracket bars being secured in the brackets against rotation relative thereto by suitable means such as through pins or by brazing or welding. Pivot brackets, as indicated at 32, 34, 36 and 38, are secured against rotation on the ends of the cylindrical members 28 and 30 and are provided with projecting arms to which are secured ball joint members received in sockets in the upper ends of respective shackle links 40, 42, 44 and 46, which extend downwardly from the respective bracket carried ball joint members.

Anchor brackets 48, 50, 52 and 54 are secured to the frame member 10 at spaced locations therealong by suitable means such as rivets or welding. Each of the frame carried anchor brackets is provided with a cylindrical bushing or sleeve portion projecting below the frame and these sleeve portions support a pair of generally cylindrical, preferably tubular, lever axis or quill shaft members 56 and 58 for rotation therein. These lever axis members are preferably so arranged that their axes are substantially at right angles to the axle center lines.

The members 56 and 58 have the same dimensions and are substantially parallel to and located immediately below the frame member 10. Each lever axis member is provided with two outwardly projecting lever arms, as indicated at 60 and 62 for the member 56, and 64 and 66 for the member 58. These lever arms are secured on the lever axis members against rotation relative thereto by suitable means such as splines or serrations or by being welded or brazed to the lever axis members.

From an inspection of Figure 2 it will be observed that the arm 60 is located at the inner side of the sleeve portion of the bracket 48 while the arm 62 is located at the adjacent side of the sleeve portion of bracket 50. Similarly, arm 64 is located at the side of the sleeve portion of bracket 52 facing bracket 54 and arm 66 is located at the inner side of the sleeve portion of bracket 54. Each of the lever arms 60, 62, 64 and 66 is provided at its outer end with a ball member in substantial vertical alignment with the corresponding ball members carried by the pivot brackets 32, 34, 36 and 38. Shackle link 40 connects the pivot bracket 32 with the lever arm 60, the link 42 connects bracket 34 with arm 62, link 44 connects bracket 36 with arm 64 and link 46 connects bracket 38 with arm 66.

The above described links and brackets constitute shackle means which secure the axle ends to the vehicle frame for movement of the axles relative to the frame by rotation of the lever axis members 56 and 58 and for a limited freedom of universal movement of the axles relative to the frame because of the construction of the ball joints and shackle links. The common line of centers of the shackle means are preferably parallel to the medial line 68 of the vehicle frame. Within tubular lever axis member 56 there is a torsion rod spring 76, as particularly illustrated in Figure 4, and within tubular member 58 there is a similar torsion rod spring 78, the lever axis members being arranged as quill shafts for the torsion bars. At its outer end torsion rod 76 is secured to quill shaft 56 by suitable means such as an enlarged externally splined or serrated portion 80 engaged with the inner surface of the end portion of quill shaft in a manner to prevent relative rotation of the quill shaft and the end of the torsion rod. Torsion rod 78 is similarly secured to the outer end of quill shaft 58 by the enlarged splined or serrated end portion 82. At their adjacent inner ends torsion rods 76 and 78 are engaged in a transfer mechanism, generally indicated at 84, which may be either a leverage mechanism or may conveniently be in the form of a small gear differential device, as illustrated.

Figures 4, 5, 6:
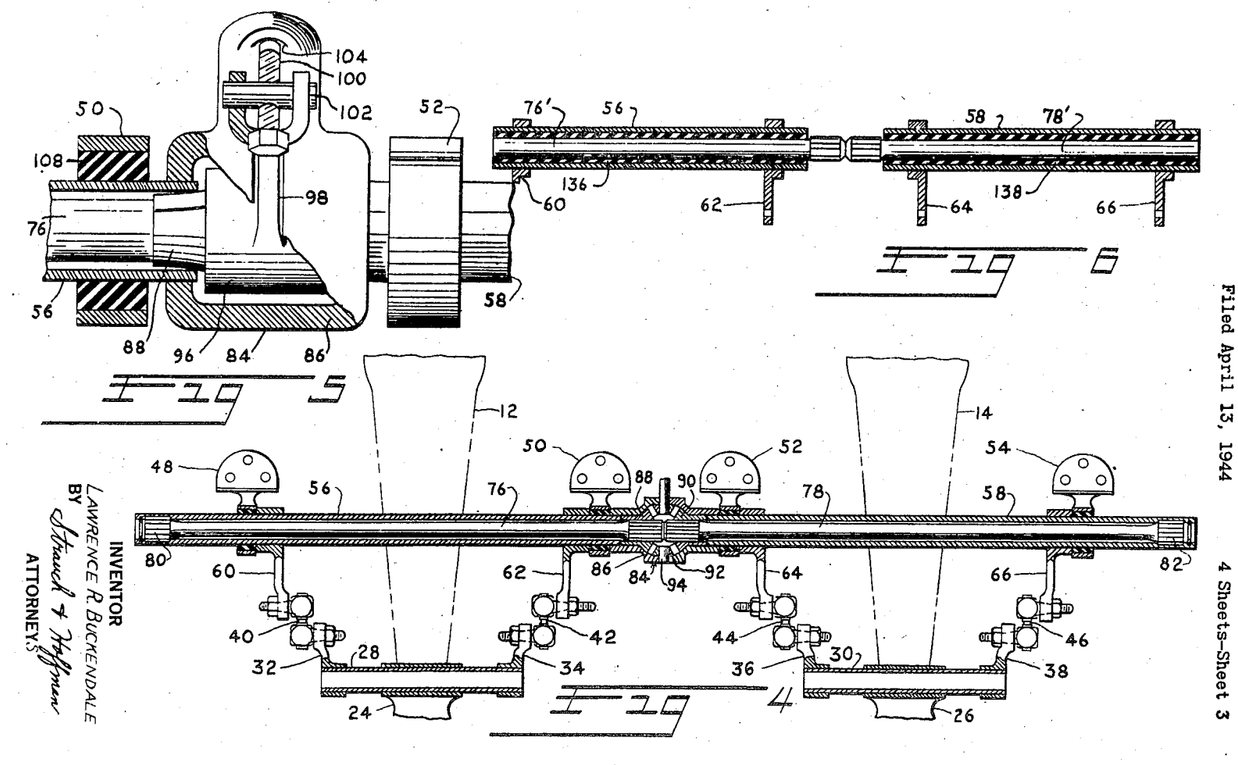
Figure 4 is a diagrammatic view of the torsional spring suspension used to support the corresponding ends of one pair of tandem axles.
Figure 5 is a detail view on an enlarged scale showing a suitable adjustment means for the torsional suspension mechanism.
Figure 6 is a somewhat diagrammatic view of a modified form of torsional spring unit.

In the differential mechanism illustrated a casing 86 is secured to the frame between brackets 50 and 52 and incloses a pair of side gears 88 and 90 which are splined to the adjacent ends of torsion rods 76 and 78 so as to be rigid therewith and mesh with differential pinion gears, one of which is indicated at 92, mounted on a differential spider member 94 carried by a differential cage member 96 as shown in Figure 5, or by the case 86 as shown in Figure 4, from which extends a radially projecting lever 98 to which is connected an adjusting mechanism, particularly illustrated in Figure 5.

A suitable adjusting mechanism may be provided by extending a bolt 100 through an internally threaded aperture in a gudgeon pin 102 carried in the bifurcated outer end portion of the lever 98, said bolt bearing at its end against a socket 104 provided in an upwardly extending portion of the case 86.

Torsion rod springs 76 and 78, axially aligned at each side of the vehicle, are thus connected at their remote ends by separate systems of links and levers to corresponding axle ends and are interconnected at adjacent ends by a differential gearing unit which has its spider, or cage, rigid with frame during vehicle operation.

Considering the suspension statically, the springs 76 and 78 are under torsional stress due to the load of the vehicle they support and connect to the axles. The static load on each axle is equal.

Considering the suspension dynamically, when corresponding axle ends are relatively vertically displaced, as when one axle end passes over a road irregularity while the other remains at road level, torsion rods 76 and 78 do not resiliently resist such relative displacement but instead relatively rotate in opposite directions due to their differential interconnection so that each axle continues to bear its equal share of the load and there is no load transfer between the axles. In effect the action is the same as if axles 14 and 16 were coupled to opposite ends of an intermediately pivoted walking beam. This action is different from the usual torsion rod spring suspension wherein all vertical movements of each individual axle are resisted or assisted by an associated torsion rod spring.

When both corresponding axle ends move the same amount in the same direction vertically the axially aligned torsion rod springs are oppositely rotatably stressed since the differential gearing resists like directional rotation of both rods. In operation under such conditions, torsional stresses on the torsion rod springs react against the frame 10 and both axle ends may be said to be independently cushion coupled to the frame at the differential.

Figure 3 illustrates the position of the lever arms and shackle links under normal or static loading conditions. Under these conditions the lever arms, as indicated by the arm 64, have their center lines slightly downward and outwardly inclined relative to the center line of the axles, as indicated at 106, and the shackle links, as indicated by the link 44, have their center lines substantially vertical or normal to the center lines of the corresponding axles.

Figure 9:
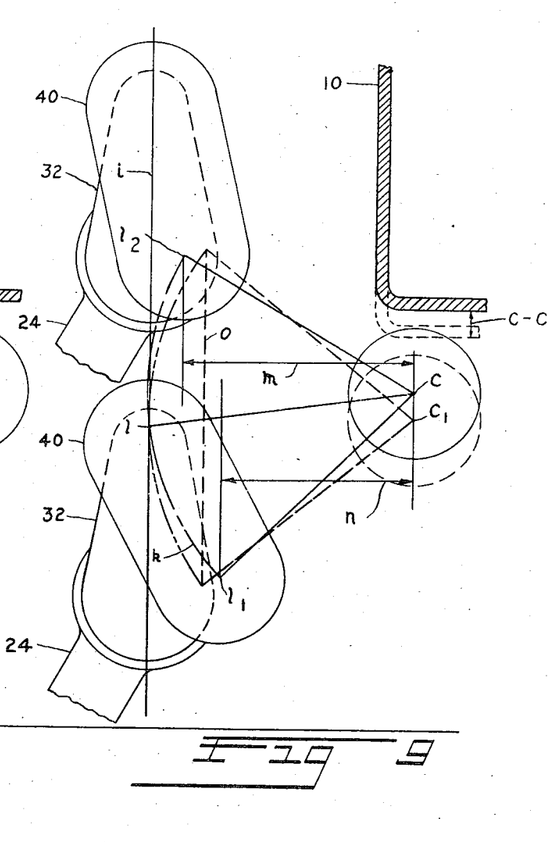
Figure 9 is a diagrammatic view of the mechanism under a different set of operating conditions from that considered in Figure 8.
Figure 10:
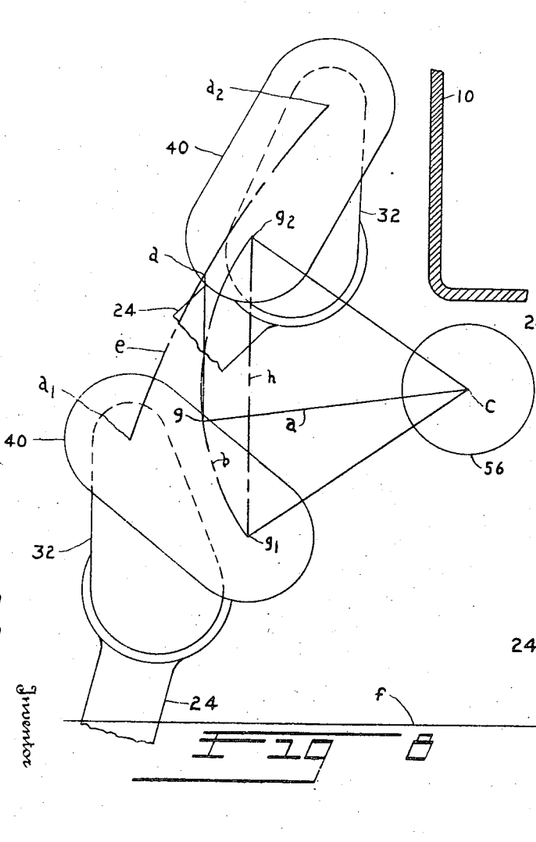

The operation of the link and lever mechanism under different loading conditions is graphically illustrated in Figures 8 and 9.

Figure 8 shows a condition under which one wheel of one axle is raised and the corresponding wheel on the same side of the other axle at the opposite end of the axle is dropped by a corresponding amount, the other wheels remaining at the original level. This condition has been selected because it represents an extreme loading condition and also because in this case vertical movement of the frame can be ignored thus simplifying the illustration. The normal static load position of the center line of the lever arm, for example lever arm 60, is represented by the line $a$ which is one radius of an arc $b$ centered at $c$ which is the axis of quill shaft 56. Under these conditions the point $d$, which is the axis of the ball joint connection between the bracket 32 and upper end of shackle link 40, moves in an arc $e$ centered at the middle of center line $f$ of axle 12. The arcs $b$ and $e$ have radii of different lengths and are centered at separated points and therefore diverge at opposite sides of the location of closest proximity, the divergence being greater below the normal static load position than above because of the geometrical relationship between the arm and the corresponding axle.

Assuming that the wheel moves equal distances above and below the normal position, the ball joint axis between the axle bracket and the shackle link will move along the arc $e$ between the lower limiting point $d_1$ and the upper limiting point $d_2$, the distance from $d$ to $d_1$ being equal to the distance from $d$ to $d_2$. At the same time the ball joint axis connecting the shackle link to the free end of lever arm 60 moves in the arc $b$ from the normal load position $g$ to the lower limiting position $g_1$ or the upper limiting position $g_2$. The distance from the point $g$ to the point $g_1$ is not the same as the distance from $g$ to $g_2$. The divergence of the arcs $b$ and $c$ causes the shackle link 40 to swing in a manner which makes the distance $g$—$g_1$ less than the distance $g$—$g_2$, more of the lever arm travel being taken up by shackle link movement on the lower side of the normal position than on the upper side.

The location of the point $g$ for normal position of the lever arm can, of course, be arbitrarily chosen within a range on the arc $b$ limited by the clearances of the components of the assembly. However, since it is desirable that the suspension spring rate remain substantially constants as the wheel moves up and down relative to the frame, or that the rate decrease somewhat as the wheel moves up and increase as it moves down, in order to more effectively cushion road shocks, a definite normal static load position to accomplish this purpose has been selected and illustrated in Figures 8 and 9. As shown in Figure 8 the line $a$ inclines downwardly and outwardly from point $c$ to point $g$, the inclination in one contemplated installation being approximately 14 degrees from the horizontal. With this arrangement, the moment arm from point $c$ to the vertical outer line $h$ is the same whether the wheel is in its upper or lower limiting position. With a constant spring rate in the torsional member 76 and a substantially constant moment arm acting on the lever 60 the suspension spring rate will remain substantially constant throughout the range of movement of the wheel relative to the frame.

The loading condition illustrated in Figure 9 is one in which both wheels on the same axle are raised or lowered simultaneously as when the vehicle starts up or down a ramp or leaves one end of an inclined ramp. Here the wheel movement is represented by the straight vertical line $i$ instead of by an arc.

If we assume the frame to be stationary and the normal static load position of the lever arm 60 to be the same as that described above in connection with Figure 8, the ball joint axis carried by the free end of the lever arm will move in the arc $k$ which includes the points $l$, $l_1$ and $l_2$. Now, since the arc diverges from the straight vertical line $i$ by substantially equal amounts both above and below the point of closest proximity, with the same normal static load position for the lever arm 60 as that indicated in Figure 8, the moment arm for the point $l$ at $l_1$ above the normal position will be different from the moment arm with the point $l$ at $l_2$ below the normal position as indicated by the lines $m$ and $n$ respectively. As the line $m$ is longer than the line $n$ there will be a greater moment arm acting on the torsion shaft when the wheel moves up than when it moves down, thus giving an effect of lower spring rate for movements above the normal position than for movements below, cushioning the shock effects as the wheels move up and down.

However, as the wheels move up or down from the normal position the frame will also move to a lesser extent, a downward displacement of the frame being indicated at $c$—$c_1$. When the frame movement has brought the torsion shaft axis from the point $c$ to the point $c_1$ the lever arm 60 will be brought to a position in which the lever arms would be equal for wheel movements above and below the normal position as indicated by the distance from point $c_1$ to broken line O.

It is thus apparent a desirable condition of uniform suspension spring rate effect or a spring rate which decreases with increasing force exerted between the axle and the frame can be obtained by properly selecting the normal static load position of the frame supporting lever arms.

The adjusting means may be used to bring the lever arms to the proper position for any normal load condition applied to the vehicle.

If, for any reason, the vehicle is unevenly loaded, so that one side of the frame tends to assume a lower position than the opposite side, the adjusting screws, as indicated at 100 in Figure 5, may be turned until the torsional springing force applied to each side of the frame is adjusted to bring the frame back into a condition of substantial parallelism with the center lines of the axles and the torque levers back to their initially chosen position. When this adjustment has been made the loads on the two wheels at each side of the vehicle will be equalized and will be maintained substantially equal by the transfer mechanism during operation of the vehicle.

A further feature of utility of the torque adjusting or wind-up mechanism is that, under special circumstances, the distance that the frame is carried above the axles may be temporarily varied by adjusting the suspension means on both sides of the vehicle. This might be done in order to raise or lower the center of gravity of the vehicle for an interval of particularly precarious driving or in order to decrease the overall height temporarily so that the vehicle could be driven through a doorway or through an overpass which it would not otherwise clear.

Suitable bearing bushings are preferably interposed between the sleeve portions of the anchor brackets 48, 50, 52 and 54, and the lever axis members 56 and 58. These may be plain antifriction bearings or may be bearing bushings of frictional material particularly arranged to impose a predetermined damping action upon rotation of the lever axis quill members or, if desired, may be resilient bushings formed of rubber or some similar resilient material and may be bonded both to the bracket sleeve and to the lever axis member to provide a cushioned damping movement for the lever axis members. Such resilient bushings may be made of sufficient thickness to absorb minor shocks and vibrations and prevent their transmission between the axles and the frame leaving only the major movements of the axles relative to the frame to be absorbed by the torsionally resilient suspension mechanism. Such a resilient bushing has been illustrated in Figure 5 and is indicated at 108.

Spacing of the corresponding pivot brackets 32 and 34 and 36 and 38 on opposite sides of respective vertical planes passing through the center lines of the corresponding axles renders the suspension mechanism capable of resisting torsional forces imposed on the axles by driving and braking loads. Since the torsional forces are resisted by an opposing couple acting through the shackle links 40 and 42, 44 and 46, which opposing couples tend to twist the corresponding lever axis members 56 and 58, if desired, members 56 and 58 may be given a predetermined torsional resiliency in order to oppose the driving and braking torque forces acting on the vehicle axles with a controlled resilient force to reduce or relieve the heavy strain which would otherwise be imposed on the suspension mechanism and the vehicle frame.

If desired, suitable means, such as shock absorbers, may be provided to damp the resilient action of the torsionally resilient suspension mechanism above described, and the effective force, spring rate and the damping rate may all be correlated to provide a certain predetermined ride for the vehicle. Thus, with the same form of suspension mechanism the ride can be made extremely soft and steady as would be desirable in the case of a passenger-carrying bus or can be made extremely hard or firm as would be desirable if the suspension means were applied to a device such as a power shovel. The desirable ride for a cargo truck would probably be intermediate the two above described conditions but the exact character of ride desired can be provided in all cases by properly designing the parts of the mechanism. In many cases provision of a special damping device will not be necessary since the relative movement between the axles and frame will be very slight and the inertia of the parts can be relied upon to provide the necessary damping action.

Driving and braking forces acting longitudinally of the vehicle are resisted by suitable links or radius rods whose action is supplementary to the action of the above described torsionally resilient suspension mechanism. As is particularly illustrated in Figure 2, radius rod 110 is pivotally connected at one end to flange 20 of axle 12 and is pivotally connected at its opposite end to the lower end of a bracket 112 secured to frame member 10 and projecting below the frame member an amount sufficient to place the radius rod in a substantially horizontal position. Longitudinal forces on axle 14 are supported by similar radius rod 114 pivotally connected at one end to flange 22 and at the opposite end to the lower end of bracket 116 secured to and projecting downwardly from the frame side member.

Figure 7:
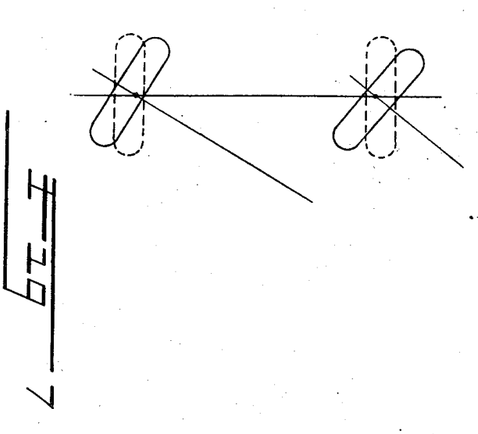
Figure 7 is a diagram view of the vehicle wheels and axles showing the manner of providing self steering of the tandem axles.

As is particularly shown in Figure 1, the radius rods 110 and 114 are inclined rearwardly and outwardly from their connections with the frame carried brackets for a purpose which is diagrammatically illustrated in Figure 7.

In Figure 7 there is illustrated a radius rod 118 connected to axle 12 on the opposite side of the vehicle frame from the radius rod 110 and a radius rod 120 connected to axle 14 on the opposite side of the frame from radius rod 114. When the vehicle is steered around a curve, as particularly illustrated in Figure 7, the frame is moved laterally relative to the axles 12 and 14 in opposite directions, being moved toward the center 122 of the turning circle relative to axle 12 and being moved relative to axle 14 in a direction away from the center of the turning circle. Assuming that in the original or straight-ahead position of the frame relative to the axles the rear ends of the radius rods 110 and 118 were at the locations indicated by the letters C and D, when the vehicle is turned toward the right, as indicated, the wheels 16 and 124 on axle 12 will tend to roll straight ahead forcing the axle in a direction relative to the frame away from the turning center 122 thereby moving points C and D over to the locations indicated at $C_1$ and $D_1$. This movement of the rear ends of the radius rods relative to the frame decreases the inclination of the rod 118 relative to the axle center line 126 and brings the rod into a position in which it tends to become perpendicular to the axle center line while the inclination of the rod 110 is increased. Thus the perpendicular distance between the axle center line and the front end of rod 118 is increased and the perpendicular distance between the axle center line and the front end of rod 110 is correspondingly decreased by swinging the axle from the position indicated by the center line 126 to the position indicated by the line 128 which line is substantially coincident with a radius passing through the center 122 of the turning circle.

At the same time, the wheels 18 and 130 on axle 14, tending to roll straight ahead, move the axle 14 inwardly or toward the center of the turning circle relative to the adjacent portion of the vehicle frame thereby moving the original locations of the rear ends of the radius rods 114 and 120 as indicated at A and B to the new locations indicated at A₁ and B₁ thereby displacing the axle from the position indicated by the line 132 to the position indicated by the line 134 which is in alignment with a radius of the turning circle passing through the center 122. The geometry of the frame, the axles 12 and 14 and the radius rods 110, 118, 114 and 120, can be so designed that the rear wheels of the vehicle will track on the turning circle and there will be no side friction on the tires and no resultant tire scuffing or tire resistance as the vehicle rounds a curve.

If desired, suitable means, such as resilient stops, may be provided to limit the movement of the vehicle frame relative to the axle so that the frame will not at any time come in contact with the tires and the movement will not twist or strain any part of the suspension mechanism beyond its elastic limit.

In the preferred plan of the arrangement illustrated in Figures 1 to 4 inclusive, substantially all of the torsional resiliency is obtained through twisting of the torque rods 76 and 78 and the length and diameter of these rods may be designed, as explained above, to provide the desired ride for the vehicle taking into consideration such facts as the weight carried, the inertia of the parts, etc.

In the modified form of torque unit disclosed in Figure 6 the inner rods 76' and 78, are not connected directly to the lever axis members 56 and 58, but the inner and outer members are resiliently connected together by resilient layers or bushings 136 and 138 of resilient material, such as rubber, bonded or otherwise connected to the inner surfaces of the outer members 56 and 58 and to the outer surfaces of the inner members 76' and 78'. When the inner members tend to rotate relative to the outer members under the suspension loads the forces are taken by the resilient bushings in shear of the material thereof.

As compound resilient torque members of the form shown in Figure 6 operate in the same manner as the resilient units shown in Figures 1 to 4, and as this particular form of torque unit has been fully described in my co-pending applications, Serial Numbers 508,020 and 516,964, a further description is believed unnecessary for the purposes of this disclosure.

From the above description it is apparent that there has been provided an improved torsional suspension system for a multi-wheel vehicle by means of which loads at the corresponding ends of tandem axles are substantially equally distributed, means are provided for compensating any unevenness of the load or any inequality in the loads on the corresponding axle ends occasioned by changes in the angularity of the torque arms and connecting links, whereby the axles are positively supported against axle torque loads occasioned by driving and braking effort and wherein the axles are self-steering in a manner which causes all of the wheels to track correctly on the arc of the turning circle of the vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Suspension means for a vehicle having a load supporting platform and a pair of tandem axles disposed transversely of and below said platform comprising members, one for each end of each axle, rotatably secured to said platform transversely of said axles and provided each with a pair of spaced apart lever arms extending beyond the adjacent side of said platform; a pair of spaced apart bracket members carried by each axle end, means pivotally connecting corresponding pairs of lever arms and bracket members along axes extending substantially parallel to the longitudinal medial line of said platform; torsionally resilient means operatively connected with said platform carried members to resist rotation thereof; and means operatively connected with said platform carried members for transferring rotation of said members in a reversed direction from one to the other on the same side of said vehicle.

2. Suspension means for a vehicle having a load supporting frame and a pair of tandem axles disposed transversely of and below said frame comprising tubular members, one for each end of each axle, mounted on said frame for rotation about axes substantially at right angles to the center lines of said axles; a pair of spaced lever arms projecting outwardly from each tubular member toward the corresponding axle end; means pivotally connecting each pair of lever arms to the corresponding axle end; torsionally resilient means extending through each tubular member and operatively connected therewith to resist rotation thereof; torque reaction supporting means operatively connected with said torsionally resilient means operative to equalize the torque resistance applied to the two tubular members on each side of said frame; and means for adjusting said torque reaction supporting means.

3. Suspension means as defined in claim 2 wherein said tubular members are substantially centered relative to the corresponding axle ends and torsional forces incident to driving and braking effort are transmitted from said axles to said frame as couples of substantially vertical force components acting through said pivotal connecting means, said lever arms and said tubular members.

4. Suspension means as defined in claim 2 wherein brackets secured to said frame support said tubular members adjacent the ends thereof, said lever arms are secured to said tubular members adjacent said brackets, and said axle ends are centered relative to the pivotal connections between said axle ends and the corresponding pairs of lever arms.

5. Suspension means as defined in claim 2 wherein brackets secured to said frame support said tubular members adjacent the ends thereof, said lever arms are secured to said tubular members adjacent said brackets, and said axle ends are centered relative to the pivotal connections between said axle ends and the corresponding pairs of lever arms, said tubular members having a predetermined amount of torsional resiliency to cushion torsional shock loads on said axles.

6. Suspension means as defined in claim 2 wherein brackets secured to said frame support said tubular members adjacent the ends thereof, said lever arms are secured to said tubular members adjacent said brackets, and said axle ends are centered relative to the pivotal connections between said axle ends and the corresponding pairs of lever arms and resilient bushings are interposed between said tubular member and the member receiving portions of said supporting brackets.

7. Suspension means for a vehicle having a load supporting frame and a pair of tandem axles disposed transversely of and below said frame comprising lever axis members, one for each end of each axle, rotatably supported on said frame transversely of said axles and provided each with a pair of outwardly extending lever arms; means on each end of each axle pivotally connecting the axle ends with corresponding pairs of lever arms; torsionally resilient means extending through at least one lever axis member on each side of frame resiliently resisting rotational movements of said lever axis members; means operatively associated with the two lever axis members on each side of said frame effective to transfer rotational movements in reverse direction between said members; brackets extending downwardly from said frame, one adjacent each axle end, and a pivoted radius rod connecting each axle end with a corresponding bracket.

8. Suspension means as defined in claim 7 wherein said radius rods are inclined rearwardly and outwardly to provide self steering movements of said tandem axles when said vehicle is steered around a curve.

9. Suspension means as defined in claim 7 wherein the pivotal connections between the axle ends and the corresponding pairs of lever arms have a limited freedom of universal movement and said radius rods are inclined rearwardly and outwardly to provide self steering movements of said tandem axles when said vehicle is steered around a curve.

10. In a vehicle having a load supporting frame and a pair of tandem axles disposed transversely of and below said frame a torsionally resilient suspension system comprising generally cylindrical members, one for each end of each axle, rotatably supported on said frame over the corresponding axle ends; a pair of spaced apart lever arms extending outwardly from each cylindrical member toward the corresponding axle end; means providing a pivotal connection between each pair of lever arms and the corresponding axle end; torsionally resilient means extending through at least one of the two cylindrical members on each side of said frame resiliently resisting rotational movements of said cylindrical members; and means carried by said frame on each side thereof operative to transfer rotational movements in reverse direction between each two cylindrical members on the same side of said frame; and a fore and aft stabilizing system comprising brackets projecting downwardly from said frame one adjacent each axle end; and a pivoted radius rod connecting each axle end with the corresponding bracket; said torsionally resilient suspension system transmitting only vertical and torsional forces between said axles and said frame, and said fore and aft stabilizing system transmitting only fore and aft forces between said axles and said frame.

11. Mechanism as defined in claim 10 wherein the means providing a pivotal connection between each pair of lever arms and the corresponding axle end comprises an upstanding bracket member on each axle end, a pair of spaced apart ball members on each bracket member, a ball member on the outer end of each lever arm, and depending links connecting the bracket member carried ball members with the lever arm carried ball members.

12. A resilient suspension for interconnecting the frame of a tandem axle vehicle at each side with associated axle ends comprising individual torsion spring assemblies, each assembly embodying a longitudinally disposed torsion spring element adapted to be rotatably mounted on said frame and flexibly connected to an associated axle end, and means connecting adjacent ends of said elements coupling said elements for relative rotation to equalize the torsion on said elements in said assemblies and locking said elements against rotation in the same direction, said means connecting the ends of said elements comprising a gear on each of said elements and an idler gear meshed with each of said gears.

13. In a resilient suspension for a tandem axle vehicle having a frame, individual torsion springs connected between the frame and each axle end at each side of the vehicle, said springs being stressed by the frame load, a load equalizing coupling device for mounting adjacent ends of the two torsion springs on each side on said frame, and means for adjusting said coupling device for simultaneously varying the torsional stresses in said springs.

14. In a resilient suspension for a tandem axle vehicle having a frame, individual torsion spring assembles connected to each axle end and each assembly comprising a frame supported spring element rotatable about an axis longitudinal of the vehicle, differential mechanism interconnecting adjacent ends of said spring elements on each side of the vehicle and embodying a cage, and means rotatably adjustably mounting said cage on said frame.

15. In a resilient suspension for a side of a tandem axle vehicle having a frame, two individual longitudinally disposed torsion springs mounted about longitudinal torsion axes on said frame and pivotally connected by motion transmitting linkage to the respective axle ends, and differential gear mechanism interconnecting adjacent ends of said springs, said mechanism embodying a spider rigid with said frame, pinions rotatable on said spider and side gears meshed with said pinions rigid with the respective ends of said springs.

16. In the suspension defined in claim 15, a cage enclosing said mechanism and carrying said spider, and means adjustably rotatably mounting said cage on said frame.

17. In a torsion-spring suspension for vehicles: the combination of a frame; axles; a pair of wheels carried by said axles at the side of the frame; suspension means connecting the axles respectively to the frame for up and down movement of the frame relative to the wheels; torsion mechanism including a torsion spring section corresponding to each wheel; means for anchoring the torsion mechanism to the frame; and means connecting the suspension means respectively to said spring sections to develop torque therein resisting the descent of the frame relative to the wheels, the two spring sections being in substantial alignment with each other, and including an equalizer differential mechanism with gears for transferring torque to and fro between the two spring sections.

18. In a torsion-spring suspension for vehicles: the combination of a frame; axles; a pair of wheels carried by said axles at the side of the frame; suspension means connecting the axles respectively to the frame for up and down movement of the frame relative to the wheels; torsion mechanism including a torsion spring section corresponding to each wheel; means for anchoring the torsion mechanism to the frame; and means connecting the suspension means respectively to said spring sections to develop torque therein resisting the descent of the frame relative to the wheels, the two spring sections including two shafts supported in longitudinal alignment with each other, with the remote ends of the shafts connected to the suspension means; gears carried respectively by the adjacent ends of said shafts, and including an equalizer differential spider connected adjustably to the said frame; with pinions mounted on the spider for transferring torque to and fro between said shafts.

19. In a torsion-spring suspension for vehicles; the combination of a plurality of axles with wheels at their ends; saddle brackets seated near the ends of said axles; a frame between said saddle brackets; spring torsion mechanism carried under said frame including a pair of aligned shafts at each side of the frame; suspension means supported on said saddle brackets, connected with the torsion mechanism and maintaining torque in said shafts; and means connecting the adjacent ends of said shafts for equalizing the torque therein, the torque developed in one shaft of each pair of aligned shafts being in the opposite direction to that of the other aligned shaft, and including a differential connection between the adjacent ends of the aligned shafts; said differential connection including bevel gears on the shaft ends, and pinions between the same meshing directly with both of said gears.

LAWRENCE R. BUCKENDALE.

REFERENCES CITED

The following references are of record in the file of this patent:

UNITED STATES PATENTS

| Number | Name | Date |
|---|---|---|
| 2,305,807 | Gramatzki | Dec. 22, 1942 |
| 2,330,482 | Fageol | Sept. 28, 1943 |
| 2,333,650 | Hickman | Nov. 9, 1943 |
| 2,210,241 | Hickman | Aug. 6, 1940 |
| 2,245,585 | Hickman | June 17, 1941 |
| 2,246,044 | Hickman | June 17, 1941 |
| 2,346,164 | Holmstrom et al. | Apr. 11, 1944 |
| 2,099,819 | Mercier | Nov. 23, 1937 |
| 2,333,008 | Holmstrom et al. | Oct. 26, 1943 |

FOREIGN PATENTS

| Number | Country | Date |
|---|---|---|
| 728,464 | France | Apr. 12, 1932 |
| 432,382 | Great Britain | Mar. 27, 1935 |